United States Patent
Bohler et al.

(10) Patent No.: US 9,118,415 B2
(45) Date of Patent: Aug. 25, 2015

(54) VISIBLE LIGHT COMMUNICATION WITH INCREASED SIGNAL-TO-NOISE RATIO

(71) Applicants: Christopher Lee Bohler, Peachtree City, GA (US); Li Li, Peachtree City, GA (US); Vaske Mikani, Senoia, GA (US)

(72) Inventors: Christopher Lee Bohler, Peachtree City, GA (US); Li Li, Peachtree City, GA (US); Vaske Mikani, Senoia, GA (US)

(73) Assignee: Cooper Technologies Company, Houston, TX (US)

( * ) Notice: Subject to any disclaimer, the term of this patent is extended or adjusted under 35 U.S.C. 154(b) by 144 days.

(21) Appl. No.: 13/835,597

(22) Filed: Mar. 15, 2013

(65) Prior Publication Data

US 2014/0241735 A1  Aug. 28, 2014

Related U.S. Application Data

(60) Provisional application No. 61/769,491, filed on Feb. 26, 2013.

(51) Int. Cl.
*H04B 10/00* (2013.01)
*H04B 10/116* (2013.01)

(52) U.S. Cl.
CPC .................................. *H04B 10/116* (2013.01)

(58) Field of Classification Search
CPC ............. H04B 10/116; H04B 10/1149; H04B 10/1141; H04B 10/1143; H04B 10/654; H04B 10/54; H04B 10/524; H04B 10/502
USPC ......... 398/172, 118, 128, 130, 127, 182, 183, 398/186, 192, 193, 194, 195, 196, 197, 189, 398/190, 191, 119; 315/158, 307, 312, 291, 315/294, 152
See application file for complete search history.

(56) References Cited

U.S. PATENT DOCUMENTS

| 8,107,825 | B2 * | 1/2012 | Rajagopal et al. | 398/172 |
| 8,588,616 | B2 * | 11/2013 | Langer et al. | 398/118 |
| 2014/0241730 | A1 * | 8/2014 | Jovicic et al. | 398/118 |

FOREIGN PATENT DOCUMENTS

| WO | WO 2010128829 | 11/2010 |
| WO | WO 2010128838 | 11/2010 |
| WO | WO 2011014044 | 2/2011 |

OTHER PUBLICATIONS

International Search Report for PCT/US2014/018351, mailed May 22, 2014.

\* cited by examiner

*Primary Examiner* — Hanh Phan
(74) *Attorney, Agent, or Firm* — King & Spalding LLP

(57) ABSTRACT

A method of increasing modulation of a visible light signal. The method can include receiving a signal that corresponds to the visible light signal, where the visible light signal has a magnitude. The method can also include adjusting, by a controller and based on the signal, a dimmer level of a dimmer by an amount, where the amount is proportional to the magnitude of the visible light signal, and where the dimmer level adjusts an output of a driver circuit. The visible light signal and the output of the driver circuit can be combined into a power signal and sent to one or more light sources. The one or more light sources can use the power signal to generate a light output that includes a visible light communication signal that is received by a receiver.

20 Claims, 5 Drawing Sheets

VISIBLE LIGHT COMMUNICATION WITH INCREASED SIGNAL-TO-NOISE RATIO

CROSS-REFERENCE TO RELATED APPLICATIONS

This application claims priority under 35 U.S.C. §119 to U.S. Provisional Patent Application Ser. No. 61/769,491, titled "Visible Light Communication with Increased Signal-To-Noise Ratio" and filed on Feb. 26, 2013, the entire contents of which are hereby incorporated herein by reference.

TECHNICAL FIELD

Embodiments described herein relate generally to visible light communication (VLC), and more particularly to systems, methods, and devices for improving the signal-to-noise ratio (SNR) for VLC.

BACKGROUND

Visible light communication is a way of allowing devices to communicate with each other using signals embedded within a light output generated by a light source. For example, with a light-emitting diode (LED) circuit, a signal (sometimes called a light communication signal or a processed power signal) generated by a LED driver and sent to one or more LEDs can include a visible light signal generated by a modulation circuit. When the LEDs illuminate using the processed power signal and the visible light signal, the LEDs send light output. The light output of the LEDs can include a visible light communication (VLC) signal and can be received by a receiver. In such a case, the receiver can separate the VLC signal from the light output (sometimes called a light communication).

SUMMARY

In general, in one aspect, the disclosure relates to a method of increasing modulation of a visible light signal. The method can include receiving a signal that corresponds to the visible light signal, where the visible light signal has a magnitude. The method can also include adjusting, by a controller and based on the signal, an input signal by an amount, where the amount is proportional to the magnitude of the visible light signal. The input signal can include the visible light signal and a power signal from a driver circuit and is received by one or more light sources. The one or more light sources can use the input signal to generate a light output that includes a visible light communication signal that is received by a receiver.

In another aspect, the disclosure can generally relate to a system for increasing modulation of a visible light signal. The system can include memory that includes an algorithm, and a hardware processor executing the algorithm. The system can also include a modulation circuit executing on the hardware processor, where the modulation circuit generates a visible light signal, and where the visible light signal includes a magnitude. The system can further include a controller, executing on the hardware processor and operatively coupled to the modulation circuit, that receives a signal based on the visible light signal and generates, in response to the signal, an adjustment signal. The system can also include a driver circuit, executing on the hardware processor and operatively coupled to the controller, that includes a dimmer, where the dimmer receives the adjustment signal and adjusts, in response to the adjustment signal, a dimming level to adjust an output of the driver circuit by an amount, where the amount is proportional to the magnitude of the visible light signal. The system can further include a light source, operatively coupled to the driver circuit and the modulation circuit, that receives the output of the driver circuit and the visible light signal and generates, using the output of the driver circuit and the visible light signal, a light output comprising a visible light communication (VLC) signal.

In another aspect, the disclosure can generally relate to a system for increasing modulation of a visible light signal. The system can include memory that includes an algorithm, and a hardware processor executing the algorithm. The system can also include a modulation circuit executing on the hardware processor, where the modulation circuit generates a visible light signal, where the visible light signal comprises a magnitude. The system can further include a controller, executing on the hardware processor and operatively coupled to the modulation circuit, that controls the magnitude of the visible light signal. The system can also include a driver circuit that generates a power signal. The system can further include a light source, operatively coupled to the driver circuit and the modulation circuit, that receives an input signal, where the input signal includes the power signal from the driver circuit and the visible light signal from the modulation circuit. The light source can generate, using the input signal, a light output having a visible light communication (VLC) signal.

These and other aspects, objects, features, and embodiments will be apparent from the following description and the appended claims.

BRIEF DESCRIPTION OF THE DRAWINGS

The drawings illustrate only example embodiments of VLC with increased SNR and are therefore not to be considered limiting of its scope, as VLC with increased SNR may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
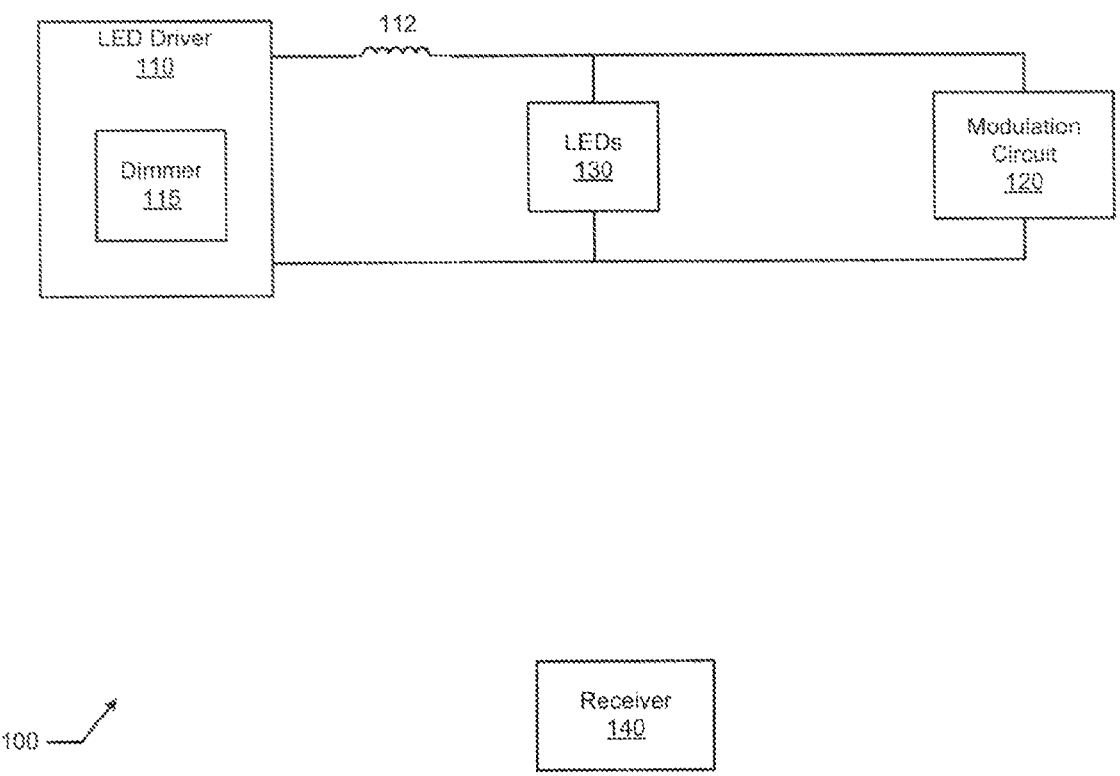
FIG. 1 shows a system diagram of a LED circuit that uses VLC currently known in the art.

The example embodiments discussed herein are directed to systems, methods, and devices for VLC with increased SNR (also called improved SNR) in electronic circuits, such as with LED lighting circuits. Specifically, example embodiments may be directed to controlling the modulation level output by a modulation circuit, a dimming level of a dimming circuit, and a time delay. Further, example embodiments coordinate the aforementioned parameters between a LED driver, the modulation circuit, and a receiver. Certain example embodiments provide a number of benefits. Examples of such benefits include, but are not limited to, little to no discernable flicker of a light source, decreased error in VLC signal detection and interpretation, user capability to adjust the settings and output, and no discernable difference in the level of light output by a light source.

While the example embodiments described herein are directed to LED lighting systems, example embodiments can also be used for other types of lighting systems (e.g., fluorescent lighting systems, organic LED lighting systems) that are used for VLC. Therefore, example embodiments of VLC with improved SNR described herein should not be considered limited to LED lighting systems.

Example embodiments of VLC with improved SNR in LED circuits will be described more fully hereinafter with reference to the accompanying drawings, in which example embodiments of VLC with improved SNR in LED circuits are shown. VLC with improved SNR in LED circuits may, however, be embodied in many different forms and should not be construed as limited to the example embodiments set forth herein. Rather, these example embodiments are provided so that this disclosure will be thorough and complete, and will fully convey the scope of VLC with improved SNR in LED circuits to those or ordinary skill in the art. Like, but not necessarily the same, elements (also sometimes called components) in the various figures are denoted by like reference numerals for consistency.

FIG. 1 shows a system diagram of a LED circuit (system) 100 that uses VLC currently known in the art. The LED circuit 100 of FIG. 1 includes a LED driver 110, a modulation circuit 120, one or more LEDs 130, and a receiver 140. The LED driver 110 can optionally include a dimmer 115. The LED driver 110 and the modulation circuit 120 are both connected in parallel with the LEDs 130 (also referred to herein as a light source). In certain embodiments, one or more of a number of other components (e.g., an inductor 112, a capacitor, a resistor, a switch, an integrated circuit) can be used in the LED circuit 100 between the LED driver 110, the modulation circuit 120, and/or the LEDs 130.

The receiver 140 is a device that receives the VLC signal, emitted as part of the light generated by the LEDs 130, and interprets the VLC signal. The receiver 140 is often a device that is physically separate from the other components of the LED system 100, but within a line of sight of the light emitted from the LEDs 130. The LEDs 130 can be part of a light fixture or stand-alone. The LEDs 130 can be any type of LED, including but not limited to chip-on-board. The LEDs 130, the LED driver 110, the dimmer 115, and the modulation circuit 120 can be positioned within the same housing and/or in separate locations. The LEDs 130 emit light output, which can include a non-VLC signal component (or, more simply, a non-VLC signal) and, in some embodiments, a VLC signal component (or, more simply, a VLC signal).

The LED driver 110 is a power supply for the LEDs 130. Specifically, the LED driver 110 receives power from a source, processes the power, and delivers the processed power to the one or more LEDs 130. The LED driver 110 can also receive, process, and/or deliver control signals to the LEDs 130. The control signals and/or processed power (collectively referred to as a power signal) can be received by the LEDs 130 from the LED driver 110 using wired and/or wireless technology. Similarly, the signals (e.g., power, control) received by the LED driver 110 from external sources can be received using wired and/or wireless technology. The LED driver 110 can be located inside of a housing, coupled to an exterior surface of such a housing, or positioned remotely from such a housing. The LED driver 110 can include one or more discrete components (e.g., transformer, resistor, relay), one or more hardware processors, any other suitable circuitry, or any combination thereof. Thus, the LED driver 110 can include software, hardware, or any combination thereof.

The dimmer 115 of the LED driver 110 controls the amount of power (adjusts the power signal) delivered by the LED driver 110 to the LEDs 130. The dimmer 115 can be controlled remotely by a user and/or by some other source. By controlling the power signal delivered by the LED driver 110 to the LEDs 130, the dimmer 115 controls the amount of light output by the LEDs 130. The dimmer 115 can be part of the LED driver 110, or the dimmer 115 can be a separate device from the LED driver 110.

The modulation circuit 120 controls the VLC signal component of the light emitted by the LEDs 130. Specifically, the modulation circuit 120 sends, in parallel with the power signal sent by the LED driver 110, a varying amount of power (the visible light signal) to the LEDs 130. The power signal sent by the LED driver 110 to the LEDs 130 is added to the visible light signal sent by the modulation circuit 120 to the LEDs 130, and the LEDs 130 emit light (generate a light output) based on the sum of the power signal received from the LED driver 110 and the visible light signal received from the modulation circuit 120. In certain example embodiments, the sum of the power signal and the visible light signal is called an input signal. In such a case, the light emitted by the LEDs can include a VLC signal component. The modulation circuit 120 can be part of the LED driver 110, or the modulation circuit 120 can be a separate device from the LED driver 110.

The varying amount of power (also called a visible light signal) sent by the modulation circuit 120 to the LEDs 130 translates directly into the VLC signal as output by the LEDs 130. In other words, the power received by the LEDs 130 from the LED driver 110 is constant because the dimmer 115, which can control the amount of power delivered by the LED driver 110 to the LEDs 130, is not used in the VLC functionality of the LED circuit 100. As a result, the modulation level (i.e., the maximum amplitude of the visible light signal sent by the modulation circuit 120 to the LEDs 130) is typically less than 2% of the maximum amplitude of the power sent by the LED driver 110 to the LEDs 130. For example, if the current delivered by the LED driver 110 to the LEDs 130 is 1.0 A, then the maximum modulation level of the modulation circuit 120 may be approximately 20 mA.

The visible light signal generated by the modulation circuit 120 can come in one or more of a number of formats. For example, when the maximum modulation level of the modulation circuit 120 is 20 mA, the VLC protocol can operate on a binary system (zeros and ones), and so the visible light signal can be zero (to correspond to a binary zero) or 20 mA (to correspond to a binary one). The VLC protocol can be communicated between the modulation circuit 120, the receiver 140, and the controller that initiates the VLC.

For currently-used LED systems 100 without the benefit of example embodiments, if the modulation level of the visible light signal delivered by the modulation circuit 120 to the LEDs 130 is greater than approximately 2% of the maximum amplitude of the power sent by the LED driver 110 to the LEDs 130, then the light emitted by the LEDs 130 have a flicker discernable by the human eye. Thus, because the maximum modulation level generated by the modulation circuit 120 is so low relative to the maximum amplitude of the power delivered by the LED driver 110 to the LEDs 130, the SNR of the VLC signal of the light output of the LEDs 130 is necessarily low. As a result of the SNR of the VLC signal being low, errors often occur by the receiver 140 in distinguishing the VLC signal from the light output of the LEDs 130 and/or, if distinguished, properly interpreting the VLC signal. Thus a balance must be struck in the LED system 100 between having a high SNR for the VLC signal while avoiding light flickering that is discernable with the human eye.

Figure 2:
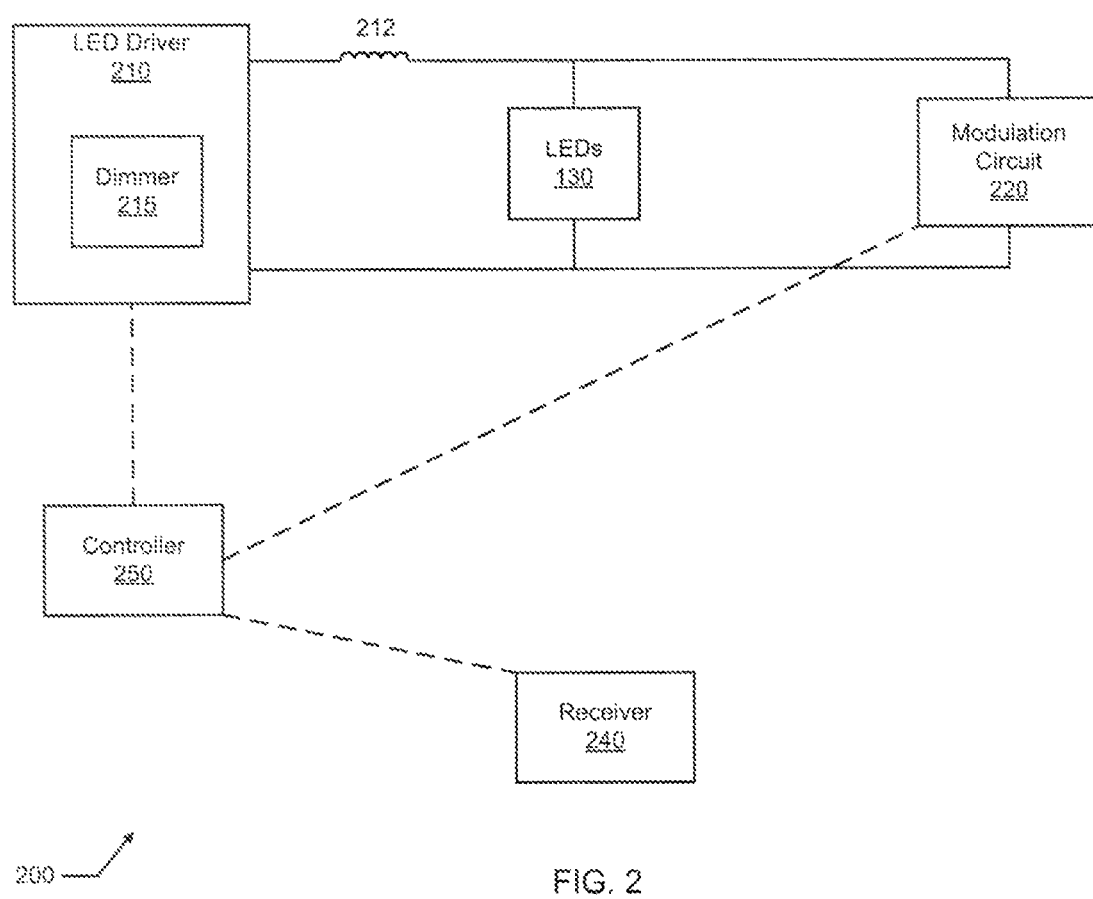
FIG. 2 shows a system diagram of a LED circuit using VLC in accordance with certain example embodiments.

Increasing the SNR of the VLC signal increases the reliability of the LED system 100 using VLC. To increase the ability of the receiver 140 to accurately and reliably receive (distinguish) and interpret VLC signals within the light output of the LEDs 130, while still avoiding light flickering in the light output that is discernable with the human eye, example embodiments can be used. FIG. 2 shows a system diagram of a LED circuit (system) 200 using VLC with improved SNR in accordance with certain example embodiments. In one or more embodiments, one or more of the features shown in FIG. 2 may be omitted, repeated, and/or substituted. Accordingly, embodiments of lighting systems using VLC with increased SNR should not be considered limited to the specific arrangements of components shown in FIG. 2. The components of FIG. 2 are substantially the same as the components described above with respect to FIG. 1, except as described below.

Unlike the dimmer 115 in FIG. 1, the dimmer 215 of the LED circuit 200 in FIG. 2 is used not only as an externally-controlled device that adjusts the power output (power signal) of the LED driver 110 to the LEDs 130. In addition, in certain example embodiments, the dimmer 215 is controlled by the controller 250 to make instantaneous (on the order of GHz) adjustments in the power signal from the LED driver 110 to the LEDs 130. Such instantaneous adjustments can coincide with, and compensate for (complement), the maximum modulation level (the visible light signal) of the modulation circuit 220 to the LEDs 130. In other words, as the modulation circuit 220 sends, at a certain point in time, a level (modulation level) of power (the visible light signal) to the LEDs 130, the dimmer 215 can adjust (e.g., reduce, increase), at or nearly at the same point in time, the amount of power delivered by the LED driver 210 to the LEDs 130.

Such an adjustment can correspond to the modulation level. For example, if the modulation circuit 220 sends a visible light signal of 100 mA to the LEDs 130, the LED driver 210 can reduce the current output by the LED driver 210 by approximately 100 mA. As another example, if the modulation circuit 220 does not send a visible light signal (i.e., the visible light signal is 0 mA) to the LEDs 130, the LED driver 210 can increase the current output by the LED driver 210 by approximately 100 mA.

As a result, the modulation circuit 220 has a larger maximum modulation level compared to the modulation circuit 120 known in the art. For example, the maximum modulation level of the modulation circuit 220 can be approximately 10% of the maximum amplitude of the power delivered by the LED driver 210. The maximum modulation level of the modulation circuit 220 can be fixed or variable. Aside from outputting a larger maximum modulation level, the modulation circuit 220 can also differ from the modulation circuit 120 by communicating with the controller 250.

In certain example embodiments, the controller 250 is communicably coupled to the dimmer 215, the modulation circuit 220, and optionally the receiver 240. In certain example embodiments, the controller 250 is a module or device that controls the dimmer 215 based on changes in the visible light signal generated by the modulation circuit 220. The controller 250 can include software and/or hardware. Examples of such hardware can include, but are not limited to, an integrated circuit, a programmable logic controller, one or more discrete components (e.g., resistor, capacitor), and one or more switches. The controller 250 can include, or be operatively coupled to, a timer.

The controller 250 can receive a signal that corresponds to a visible light signal. In some cases, the signal is a visible light signal. The signal can be received from the modulation circuit 220, an external source (e.g., another controller), a different portion of the controller 250, or any combination thereof. The controller 250 can use this signal to adjust (e.g., increase, decrease) the dimmer level of the dimmer 215. Such a signal sent by the controller 250 to the dimmer 215 can be called an adjustment signal. For example, the controller 250 can adjust the dimmer level of the dimmer 215 by sending an adjustment signal that is based on a calculation performed by the controller 250 that is based on the visible light signal sent by the modulation circuit 220 to the LEDs 130. Such a calculation can be based on an algorithm stored in the controller 250.

In certain example embodiments, the controller 250 also uses the adjustment signal (generated by the controller 250) to control the output (the amplitude of the visible light signal) of the modulation circuit 220. Alternatively, the modulation circuit 220 can generate a visible light signal (either the same as the visible light signal sent by the modulation circuit 220 to the LEDs 130 or a different visible light signal), which is received by the controller 250. In such a case, the controller 250 can use the visible light signal to send an adjustment signal to the dimmer 215 to adjust the dimming level. This feedback path (modulation circuit 220 to controller 250 to dimmer 215) can use optics and/or an electric circuit to communicate. In certain example embodiments, the feedback path uses an electric circuit (wired and/or wireless) rather than optics because the electric circuit can be less expensive and more reliable than optics.

In certain example embodiments, the controller 250 also controls the maximum modulation level of the modulation circuit 220. Alternatively, the maximum modulation level of the modulation circuit 220 can be fixed, as by a user, a manufacturer, or some other entity. In addition, or in the alternative, the controller 250 can adjust a dimmer level of the dimmer 215 to a level that corresponds to the output (e.g., the maximum modulation level) of the modulation circuit 220. The dimmer level of the dimmer 215 (and thus the output of the LED driver 210) can be proportional (e.g., directly inverse, inversely) to the magnitude of the visible light signal generated by the modulation circuit 220. The controller 250 can be part of, or a different component from, the controlling unit that exists for a LED system 200 using VLC and converting the VLC signal that is being sent as an output of the modulation circuit 220.

In certain example embodiments, the dimmer level at which the controller 250 sets the dimmer 215 is substantially the inverse of the output (e.g., the maximum modulation level of the visible light signal) of the modulation circuit 220. For example, if the output of the modulation circuit 220 is 0.1 A, then the controller 250 can set the dimmer level of the dimmer 215 to approximately 0.9 A for a LED module 210 that has a normal output level of 1.0 A. The controller 250 can control the dimmer level of the dimmer 215 and/or the maximum modulation level of the modulation circuit 220 in real time and/or in advance, as by using a protocol sent to the dimmer 215 and/or the modulation circuit 220. The controller 250 can adjust the dimmer level of the dimmer 215 and/or the maximum modulation level of the modulation circuit 220 in terms of a percentage of power (e.g., 10% reduction based on the normal output level), a discrete amount of power (e.g., a 0.1 A increase), or some other suitable measure of power.

In addition to (or in the alternative of) controlling the amplitude of the power signal of the LED driver 210 using the dimmer 215 and/or the visible light signal of the modulation circuit 220, the controller 250 can, in certain example embodiments, control the timing of such changes using the timer (not shown) that is part of, or operatively coupled to, the controller 250. Specifically, the controller 250 can control when the amplitude of the power signal of the LED driver 210 using the dimmer 215 and/or the visible light signal of the modulation circuit 220 change relative to each other in certain example embodiments. In other words, the controller 250 can adjust the dimmer level of the dimmer 215 before, after, or at the instant when the output of the modulation circuit 220 is changed. The amount of time that the controller 250 can adjust the dimmer level of the dimmer 215 before or after the time when the output (visible light signal) of the modulation circuit 220 is changed can vary, but in no case can be so long as to cause a flicker in the output of the LEDs 130 that is discernable to the human eye. An example of such a maximum amount of time can be 10 ms.

In certain example embodiments, the dimmer 215 is optional, which means that the power signal generated by the LED driver 210 and sent to the LEDs 130 is substantially constant. In such a case, the controller 250 can control the magnitude of the visible light signal generated by the modulation circuit 220 and sent to the LEDs 130. The control of the modulation circuit 220 by the controller 250 can be according to a protocol known by the receiver 240

In other example embodiments, the controller 250 can control the magnitude of the visible light signal generated by the modulation circuit 220 and sent to the LEDs 130, even if the LED driver 210 includes a dimmer 215. In such a case, the dimmer 215 and the LED driver 210 can operate as described above with respect to the dimmer 115 and the LED driver 110 of FIG. 1. The magnitude of the visible light signal controlled by the controller can be based on the dimmer level of the dimmer 215.

In certain example embodiments, the dimmer 215 is part of, or is the same component as, the modulation circuit 220. In such a case, if the modulation circuit 220 is capable of a maximum modulation level (visible light signal), the dimmer 215 can adjust the magnitude of the visible light signal between zero and the maximum level.

Figure 3A:
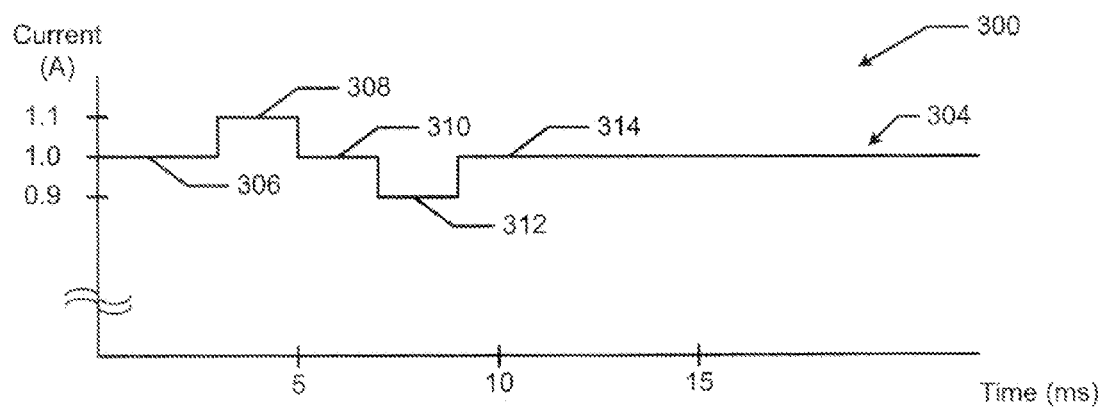
FIGS. 3A-C show graphs of various currents flowing through components of the LED circuit of FIG. 2 in accordance with certain example embodiments.
Figure 3B:
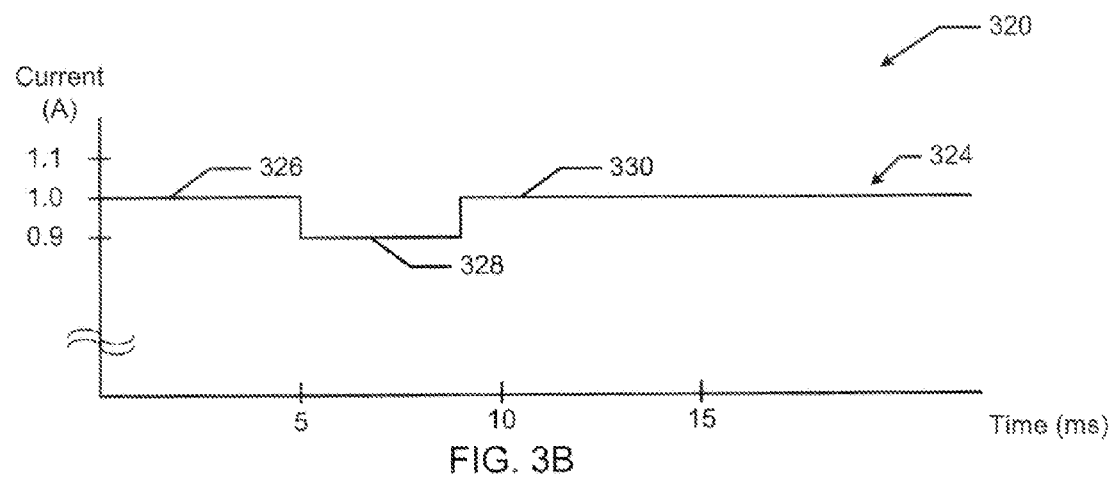
Figure 3C:
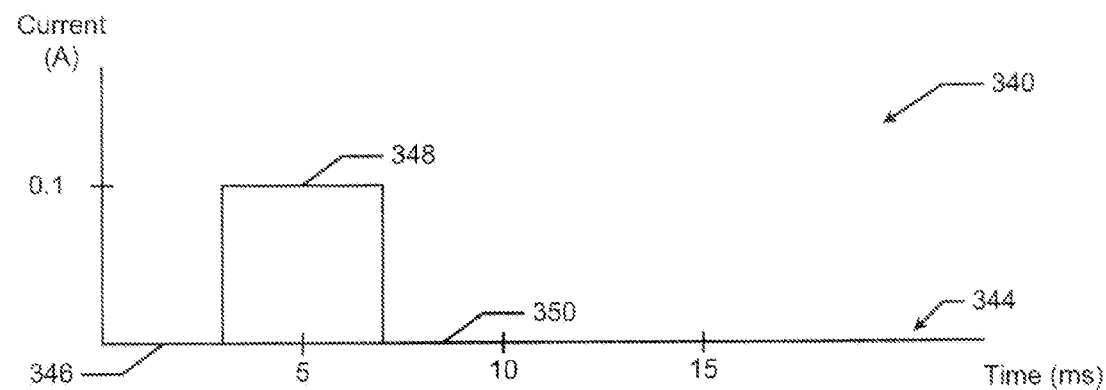

An example of how the controller 250 controls the output of the dimmer 215 and/or the modulation circuit 220 with respect to each other in real time is shown in FIGS. 3A-C. Referring to FIGS. 2-3C, FIG. 3A shows a graph 300 of the total current 304 flowing through the LEDs 130, which creates a light output of the LEDs 130. FIG. 3B shows a graph 320 of the current 324 flowing out of the LED driver 210 based on the dimmer level of the dimmer 215. FIG. 3C shows a graph 340 of the current 344 (the visible light signal) flowing out of the modulation circuit 220. In other words, the current 304 in FIG. 3A is the sum of the current 324 in FIG. 3B and the current 344 in FIG. 3C.

As can be seen in FIG. 3A, up until approximately 3 ms, the visible light signal 346 in FIG. 3C is zero, and so the current 306 in FIG. 3A flowing through the LEDs 130 is identical to the current 326 in FIG. 3B generated by the LED driver 210, which is approximately 1.0 A. During this time (up to approximately 3 ms), the dimmer level of the dimmer 215 is 100%. At approximately 3 ms, the visible light signal 348 in FIG. 3C jumps to 0.1 A. The controller 250 adjusts the dimmer 215 with a 2 ms lag after the modulation circuit 220 changes the visible light signal 348. As a result, the current 308 in FIG. 3A flowing through LEDs 130 is approximately 1.1 A between 3 ms and 5 ms. In certain example embodiments, the controller 250 receives a signal in advance of the change in the visible light signal generated by the modulation circuit 220. In such a case, the controller 250 can adjust the dimmer level of the dimmer 215 in advance of, or at the same time as, a change in the visible light signal generated by the modulation circuit 220.

Continuing with the example in FIGS. 3A-C, at 5 ms, the 2 ms lag to adjust the dimmer level of the dimmer 215 has elapsed, and so the controller 250 adjusts the dimmer level of the dimmer 215 down by approximately 0.1 A (down to approximately 90%) so that the current 328 in FIG. 3B generated by the LED driver 210 is approximately 0.9 A, which compensates for the 0.1 A of the visible light signal 348 in FIG. 3C generated by the modulation circuit 220. As a result, the total current 310 in FIG. 3A flowing through the LEDs 130 is back to 1.0 A.

At approximately 7 ms, the visible light signal 350 in FIG. 3C returns to zero. This causes the total current 312 in FIG. 3A flowing through the LEDs 130 to drop to 0.9 A. Again, because of the 2 ms lag in the dimmer level of the dimmer 215 being adjusted by the controller 250 in response to a change in the visible light signal 344, the total current 312 in FIG. 3A flowing through the LEDs 130 remains at approximately 0.9 A until 9 ms. At 9 ms, the controller 250 adjusts the dimmer level of the dimmer 215 upward by approximately 0.1 A (back to 100%) so that the current 330 in FIG. 3B generated by the LED driver 210 is approximately 1.0 A, which is the normal operating condition at the start of this example.

In certain example embodiments, the controller 250 can also determine that an intensity of the visible light signal exceeds a threshold value. In such a case, a threshold value can correspond to an amount of time and/or an amount of power delivered to the LEDs 130. For example, if the VLC protocol is a binary system, and if the visible light signal contains 3,000 binary "1"s in a 4,096 bit string, the controller 250 may determine that a threshold has been exceeded. In such a case, in certain example embodiments, the controller 250 can disable and/or pause the modulation circuit 220 (set the visible light signal to zero) for a period of time and/or until a condition (e.g., the threshold is no longer exceeded) has been satisfied. After the period of time has expired and/or the condition is satisfied, the controller 250 can re-enable and/or unpause the modulation circuit 220.

In addition, or in the alternative, if the controller 250 determines that a threshold value has been exceeded, then the controller 250 can disable the dimmer 215 (e.g., set the dimmer level to 100%) and/or lock the dimmer level of the dimmer 215 at a certain level. The purpose of this feature can be to avoid situations where a relatively large number of zeros or ones within a period of time (e.g., 2 ms) can otherwise cause a discernable brightness or dimness in the light output by the LEDs 130.

Figure 4:
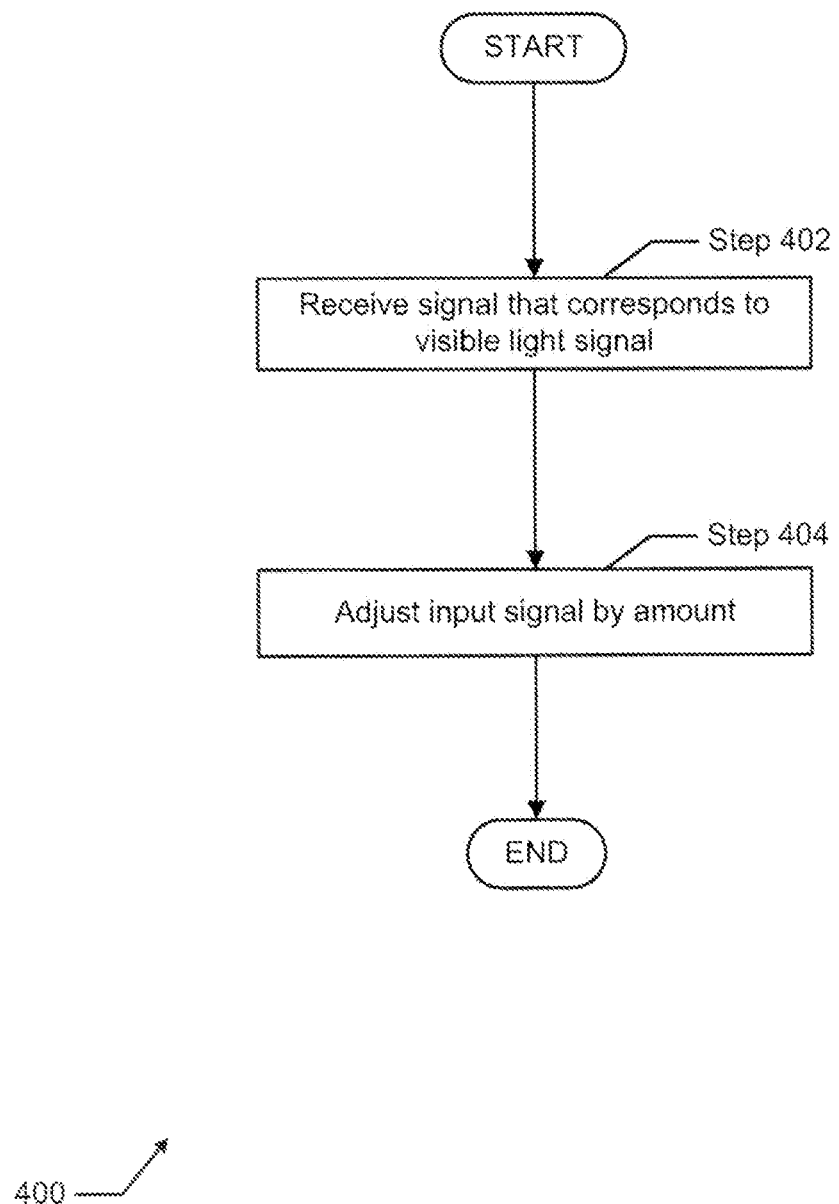
FIG. 4 is a flowchart presenting a method of increasing modulation of a visible light signal in a LED circuit in accordance with certain example embodiments.

FIG. 4 is a flowchart presenting an example method 400 for increasing the modulation of a visible light signal in accordance with certain example embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the example embodiments, one or more of the steps described below may be omitted, repeated, and/or performed in a different order.

In addition, a person of ordinary skill in the art will appreciate that additional steps not shown in FIG. 4, may be included in performing this method. Accordingly, the specific arrangement of steps should not be construed as limiting the scope. Further, a particular computing device, as described, for example, in FIG. 5 below, may be used to perform one or more of the steps for the method 400 described below.

Referring now to FIGS. 2-4, the example method 400 begins at the START step and proceeds to Step 402, where a signal that corresponds to the visible light signal is received. In certain example embodiments, the controller 250 receives the signal. The controller 250 can receive the signal from the modulation circuit 220, another controller, and/or some other component or entity of the LED system 200. The visible light signal can have a magnitude that corresponds to the maximum modulation level of the modulation circuit 220. The signal can be the visible light signal.

In Step 404, an input signal is adjusted by an amount. The input signal can be adjusted by the controller 250. The input signal can be the sum of the visible light signal generated by the modulation circuit 220 and the power signal generated by the LED driver 210. The amount that the input signal is adjusted can be proportional to the magnitude of the visible light signal.

In certain example embodiments, the input signal is adjusted by the controller 250 when the controller 250 adjusts the dimmer level of the dimmer 215. As described above, the dimmer 215 can control (adjust) the power signal sent by the LED driver 210 (or any driver circuit). The amount that the dimmer level of the dimmer 215 is adjusted can be based on the signal received by the controller 250 in step 402 and can be proportional (e.g., inversely) to the magnitude of the visible light signal and/or a change in the visible light signal. The visible light signal and the output of the LED driver 210 can be combined into a power signal and sent to one or more light sources (e.g., LEDs 130). The LEDs 130 can use the power signal to generate a light output that includes the VLC signal that is received by the receiver 240.

In addition to adjusting the dimmer level of the dimmer 215, or in the alternative, the controller 250 can adjust the visible light signal that is generated by the modulation circuit 220. In such a case, the output of the LED driver 210 can be constant, regardless of the dimmer level of the dimmer 215. The amount that the modulation level of the modulation circuit 220 is adjusted by the controller 250 can be based on the signal received by the controller 250 in step 402 and can be proportional (e.g., directly) to the signal received by the controller 250 in step 402.

As described above, the visible light signal and the output of the LED driver 210 can be combined into a power signal and sent to one or more light sources (e.g., LEDs 130). The LEDs 130 can use the power signal to generate a light output that includes the VLC signal that is received by the receiver 240. If the dimmer 215 is operatively coupled to, or is the same as, the modulation circuit 220, then the visible light signal can be adjusted by adjusting the dimmer level of the dimmer 215 in such a case.

In any case, the controller 250 use a timer to adjust the input signal in advance, at substantially the same time, or after a corresponding change in the visible light signal. The receiver, the controller 250, and any other appropriate components (e.g., the LED driver 210, the modulation circuit 220, the dimmer 215) can coordinate using one or more of a number of protocols and/or algorithms so that the adjustments to the input signal and/or the time delays are interpreted correctly within the LED system 200.

In certain example embodiments, when the signal received by the controller 250 is continuous (or only minimally interrupted to be considered continuous), the process can be repeated between step 402 and step 404. In such a case, the controller 250 can adjust the dimmer 215 and/or the magnitude of the visible light signal based on one or more factors, including but not limited to changes in the visible light signal generated by the modulation circuit 220, a change in the dimmer level of the dimmer 215, and the existence of the dimmer 215.

Also, as explained above, the controller 250 can suspend the operation of the modulation circuit 220 to avoid a circumstance where the light output of the LEDs 130 appears too bright or too dim based on the dimmer setting of the dimmer 215 as set by a user. In such a case, the controller 250 can, in certain example embodiments, send a suspension signal to the receiver 240 to notify the receiver 240 that the visible light signal is not being generated by the modulation circuit 220, and so that there is no VLC signal in the light output of the LEDs 130. In such a case, when the period of time expires (or when a condition has been satisfied), the suspension signal is no longer sent from the controller 250 to the receiver 240. Alternatively, the controller 250 can send a resume signal to the receiver 240 to notify the receiver 240 that the visible light signal is again being generated by the modulation circuit 220, and so that there the VLC signal is present in the light output of the LEDs 130. After step 404 is completed, the process returns to the END step.

Figure 5:
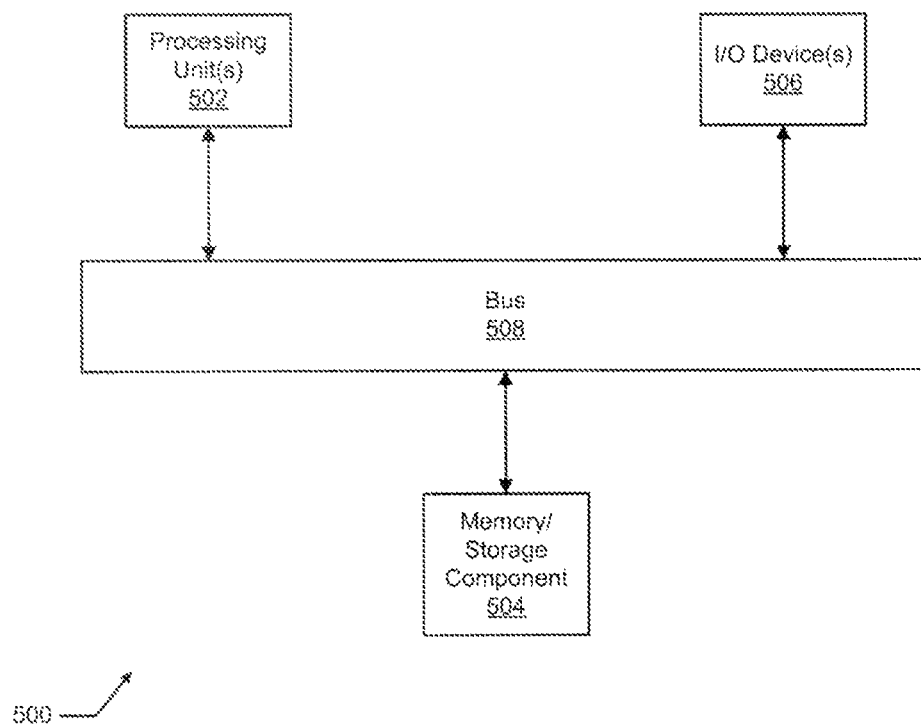
FIG. 5 shows a computer system used for increasing modulation of a visible light signal in a LED circuit in accordance with certain example embodiments.

FIG. 5 illustrates one embodiment of a computing device 500 capable of implementing one or more of the various techniques described herein, and which may be representative, in whole or in part, of the elements described herein. Computing device 500 is only one example of a computing device and is not intended to suggest any limitation as to scope of use or functionality of the computing device and/or its possible architectures. Neither should computing device 500 be interpreted as having any dependency or requirement relating to any one or combination of components illustrated in the example computing device 500. As shown in FIG. 5, the bus 508 is operatively coupled to each of the processing unit(s) 502, the I/O device(s) 506, and the memory/storage component 504.

Computing device 500 includes one or more processors or processing units 502, one or more memory/storage components 504, one or more input/output (I/O) devices 506, and a bus 508 that allows the various components and devices to communicate with one another. Bus 508 represents one or more of any of several types of bus structures, including a memory bus or memory controller, a peripheral bus, an accelerated graphics port, and a processor or local bus using any of a variety of bus architectures. Bus 508 can include wired and/or wireless buses.

Memory/storage component 504 represents one or more computer storage media. Memory/storage component 504 may include volatile media (such as random access memory (RAM)) and/or nonvolatile media (such as read only memory (ROM), flash memory, optical disks, magnetic disks, and so forth). Memory/storage component 504 can include fixed media (e.g., RAM, ROM, a fixed hard drive, etc.) as well as removable media (e.g., a Flash memory drive, a removable hard drive, an optical disk, and so forth).

One or more I/O devices 506 allow a customer, utility, or other user to enter commands and information to computing device 500, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media may be any available non-transitory medium or non-transitory media that can be accessed by a computing device. By way of example, and not limitation, computer readable media may comprise "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computer device 500 may be connected to a network (not shown) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system 500 includes at least the minimal processing, input, and/or output means necessary to practice one or more embodiments.

Further, those skilled in the art will appreciate that one or more elements of the aforementioned computer device 500 may be located at a remote location and connected to the other elements over a network. Further, one or more example embodiments may be implemented on a distributed system having a plurality of nodes, where each portion of the implementation (e.g., controller, modulation circuit, dimmer) may be located on a different node within the distributed system. In one or more embodiments, the node corresponds to a computer system. Alternatively, the node may correspond to a processor with associated physical memory. The node may alternatively correspond to a processor with shared memory and/or resources.

In one or more example embodiments, dimming for LED circuits reduces current ripple effect, decreases the cost of parts and manufacturing, and allows for better dimming control of AC-powered LED circuits, particularly for low-cost AC-powered LED circuits.

Accordingly, many modifications and other embodiments set forth herein will come to mind to one skilled in the art to which dimming for LED circuits pertain having the benefit of the teachings presented in the foregoing descriptions and the associated drawings. Therefore, it is to be understood that dimming for LED circuits are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A method of increasing modulation of a visible light signal, the method comprising:
   receiving, by a controller, a signal that corresponds to the visible light signal, wherein the visible light signal has a magnitude; and
   adjusting, by the controller and based on the signal, an input signal generated by a dimmer and a modulation circuit by an amount, wherein the amount is proportional to the magnitude of the visible light signal;
   wherein the input signal comprises the visible light signal generated by the modulation circuit and a power signal generated by a driver circuit,
   wherein the driver circuit comprises the dimmer, wherein the input signal is received by one or more light sources, and
   wherein the one or more light sources use the input signal to generate a light output that comprises a visible light communication signal that is received by a receiver.

2. The method of claim 1, wherein the controller adjusts the input signal by adjusting a dimmer level of the dimmer, wherein the dimmer adjusts the power signal generated by the driver circuit.

3. The method of claim 2, wherein the controller comprises an algorithm to adjust the power signal of the driver circuit before generating the visible light signal.

4. The method of claim 3, wherein the power signal of the driver circuit is adjusted no more than approximately 10 milliseconds before generating the visible light signal.

5. The method of claim 2, wherein the controller comprises an algorithm to adjust the power signal of the driver circuit after generating the visible light signal.

6. The method of claim 5, wherein the power signal of the driver circuit is adjusted no more than approximately 10 milliseconds after generating the visible light signal.

7. The method of claim 1, wherein the controller adjusts the input signal by adjusting a magnitude of the visible light signal generated by the modulation circuit.

8. The method of claim 1, further comprising:
   determining that an intensity of the visible light signal exceeds a threshold value;
   ceasing, in response to determining that the intensity of the visible light signal exceeds the threshold value, to generate the visible light signal for a period of time; and
   resuming, when the period of time has ended, generation of the visible light signal.

9. The method of claim 8, wherein the receiver uses the algorithm to determine that the visible light signal is not generated during the period of time.

10. The method of claim 8, wherein the receiver receives a suspension signal from the controller to notify the receiver that the visible light signal is not generated during the period of time.

11. The method of claim 8, wherein the period of time is no more than approximately 10 milliseconds.

12. The method of claim 8, wherein determining that the intensity of the visible light signal exceeds a threshold value comprises determining that a number of binary "1"s in the visible light signal exceeds the threshold value.

13. The method of claim 1, wherein the magnitude is at least 4% of the output of the driver circuit.

14. The method of claim 1, wherein adjusting the dimmer level of the dimmer comprises:
   generating an adjustment signal based on the visible light signal; and
   sending the adjustment signal to the dimmer.

15. The method of claim 1, further comprising:
   adjusting, by the controller and based on the signal, a modulation level of a modulation circuit, wherein the modulation circuit generates the visible light signal based on the modulation level.

16. A system for increasing modulation of a visible light signal, the system comprising:
memory comprising an algorithm;
a hardware processor executing the algorithm;
a modulation circuit executing on the hardware processor, wherein the modulation circuit generates a visible light signal, wherein the visible light signal comprises a magnitude;
a controller, executing on the hardware processor and operatively coupled to the modulation circuit, that receives a signal based on the visible light signal and generates, in response to the signal, an adjustment signal;
a driver circuit, executing on the hardware processor and operatively coupled to the controller and the modulation circuit, comprising a dimmer, wherein the dimmer receives the adjustment signal from the controller and adjusts, in response to the adjustment signal, a dimming level to adjust an output of the driver circuit by an amount, wherein the amount is proportional to the magnitude of the visible light signal; and
a light source, operatively coupled to the driver circuit and the modulation circuit, that receives the output of the driver circuit and the visible light signal and generates, using the output of the driver circuit and the visible light signal, a light output comprising a visible light communication (VLC) signal.

17. The system of claim 16, further comprising:
a receiver operatively coupled to the light source and the controller, wherein the receiver receives the light and translates the VLC signal.

18. The system of claim 16, wherein the controller further comprises a timer that is used to control when the adjustment signal is sent to the dimmer.

19. The system of claim 16, wherein the memory further comprises threshold values that are used by the controller to determine when the modulation circuit is disabled by the controller.

20. A system for increasing modulation of a visible light signal, the system comprising:
memory comprising an algorithm;
a hardware processor executing the algorithm;
a modulation circuit executing on the hardware processor, wherein the modulation circuit generates a visible light signal, wherein the visible light signal comprises a magnitude;
a controller, executing on the hardware processor and operatively coupled to the modulation circuit, that controls the magnitude of the visible light signal;
a driver circuit operatively coupled to the controller, wherein the driver circuit comprises a dimmer and generates a power signal based on a dimmer level of the dimmer, wherein the dimmer level is set by the controller; and
a light source, operatively coupled to the driver circuit and the modulation circuit, that receives an input signal, wherein the input signal comprises the power signal from the driver circuit and the visible light signal from the modulation circuit,
wherein the light source generates, using the input signal, a light output comprising a visible light communication (VLC) signal.

\* \* \* \* \*